US011506364B2

(12) United States Patent
Ni et al.

(10) Patent No.: US 11,506,364 B2
(45) Date of Patent: Nov. 22, 2022

(54) CONNECTION SYSTEM FOR A LUMINAIRE, AND A LIGHTING SYSTEM USING THE CONNECTION SYSTEM

(71) Applicant: SIGNIFY HOLDING B.V., Eindhoven (NL)

(72) Inventors: Hai Lin Ni, Chongqin (CN); Xia Wang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/415,129

(22) PCT Filed: Dec. 19, 2019

(86) PCT No.: PCT/EP2019/086246
§ 371 (c)(1),
(2) Date: Jun. 17, 2021

(87) PCT Pub. No.: WO2020/127690
PCT Pub. Date: Jun. 25, 2020

(65) Prior Publication Data
US 2022/0074578 A1 Mar. 10, 2022

(30) Foreign Application Priority Data

Dec. 20, 2018 (WO) ............... PCT/CN2018/122346
Feb. 25, 2019 (EP) .................................. 19159034

(51) Int. Cl.
*F21V 21/005* (2006.01)
*F21V 17/12* (2006.01)

(52) U.S. Cl.
CPC ............ *F21V 21/005* (2013.01); *F21V 17/12* (2013.01)

(58) Field of Classification Search
CPC ......... F21V 21/005; F21V 17/12; F21K 9/237
See application file for complete search history.

(56) References Cited

U.S. PATENT DOCUMENTS 2,383,007 A 8/1945 Maurette
3,275,355 A 9/1966 Endler et al.
(Continued)

FOREIGN PATENT DOCUMENTS

CN 205782218 U 12/2016
CN 107940282 A 4/2018
(Continued)

OTHER PUBLICATIONS

Machine translation of DE 10 2016 110 399. (Year: 2016).*

*Primary Examiner* — Leah Simone Macchiarolo

(57) ABSTRACT

A connection system for a linear lighting system has channels of adjacent luminaires coupled together by a coupling arrangement having a first plate, a second plate and fixings for clamping the first and second plates around wall portions of the two channels. The fixings are slidable along slots so that the coupling arrangement can be slid into an operable position or to an out-of-the way position for disassembly. One of the first and second plates comprises a spring member having sprung projections for projecting into the apertures, to provide an automatic clamping function when the coupling arrangement is tightened. For example, there may be an outer coupling plate and an inner spring plate which forms the spring member.

13 Claims, 7 Drawing Sheets

(56) References Cited

U.S. PATENT DOCUMENTS

| | | | |
|---|---|---|---|
| 5,658,066 A | 8/1997 | Hirsch | |
| 6,220,721 B1 | 4/2001 | Kingsley et al. | |
| 6,659,628 B2 | 12/2003 | Del Campo | |
| 9,470,375 B2 | 10/2016 | Van Es et al. | |
| 2005/0047129 A1 | 3/2005 | Eppler | |
| 2019/0120444 A1* | 4/2019 | Martin | E04B 9/006 |
| 2020/0173639 A1* | 6/2020 | Martin | F21V 21/048 |

FOREIGN PATENT DOCUMENTS

| | | | | |
|---|---|---|---|---|
| CN | 108413273 A | | 8/2018 | |
| DE | 102016110399 A1 | * | 12/2016 | F21V 23/06 |
| EP | 0870981 A1 | | 10/1998 | |
| EP | 3009732 A1 | | 4/2016 | |
| FR | 2680560 A1 | | 2/1993 | |
| FR | 3053766 A1 | | 1/2018 | |
| GB | 2472837 A | | 2/2011 | |
| JP | 2005243599 A | | 9/2005 | |

* cited by examiner

CONNECTION SYSTEM FOR A LUMINAIRE, AND A LIGHTING SYSTEM USING THE CONNECTION SYSTEM

CROSS-REFERENCE TO PRIOR APPLICATIONS

This application is the U.S. National Phase application under 35 U.S.C. § 371 of International Application No. PCT/EP2019/086246, filed on Dec. 19, 2019, which claims the benefit of International Application No. PCT/CN2018/122346, filed on Dec. 20, 2018, and European Patent Application No. 19159034.8, filed on Feb. 25, 2019. These applications are hereby incorporated by reference herein.

FIELD OF THE INVENTION

This invention relates to linear luminaires, in particular formed as a set of interconnected channels.

BACKGROUND OF THE INVENTION

It is known to form linear luminaires as a set of connected channels. Each individual channel may be considered to form part of a separate luminaire, and together they define an overall lighting system. The channels are coupled together to form a line. Each channel defines a housing of the respective luminaire.

The connected channels may for example be suspended from a ceiling or else the side walls and bases of the channels may be recessed into a ceiling.

It is desirable to be able to install the channels together in a perfectly straight line. Typically, mounting brackets and additional pins are used in the lighting system to hold the channels together, one by one. For example, some connecting parts may be mounted inside or outside the two luminaires to connect the two channels, i.e. connect the luminaires, together. The longer the coupling parts, the better the control of how straight the two channels can be made after being installed.

A problem which arises for a connected set of channels is that it may be difficult and complicated to remove one luminaire that needs to be replaced or repaired from the overall system.

Furthermore, it may be difficult to obtain or keep a tight fit between two channels. They may need to be held together with their vertical end surfaces face-to-face while the making the connection.

It would be desirable to have a channel design, which simplifies connecting and disconnecting, and makes a tight fitting between adjacent channels easier to achieve.

SUMMARY OF THE INVENTION

The invention is defined by the claims.

According to examples in accordance with an aspect of the invention, there is a linear lighting system comprising: a set of at least two luminaires, each luminaire comprising:
an elongate channel having an elongate axis, at least one end of the channel comprising:
a wall portion;
a first slot which is within the first wall portion, reaches the at least one end, and is parallel to the elongate axis; and
an aperture within the first wall portion,
wherein the dimensions of the slot and the aperture are arranged to enable connection of the channels of two luminaires together using a connection system for coupling respective ends of the channels of adjacent luminaires;
wherein the connection system comprises a coupling arrangement for coupling respective ends of the channels of two luminaires together each other, the coupling arrangement comprising:
a first plate, a second plate and fixings for clamping the first plate and the second plate and passing through the first slots,
wherein the fixings are slidable along the first slots, and
wherein the second plate comprises a spring member having first and second sprung projections for projecting into the apertures of two adjacent channels.

The first plate is for example an outer coupling plate and the second plate is for example an inner spring plate.

This connection system is suitable for connecting channels of a modular arrangement. The channels are coupled together by the coupling arrangement of the connection system. The sliding of the fixings along the first slots means the coupling arrangement can be slid away from the butted ends of the two channels when it is loosened. This means a channel may be easily removed away from a series connection of channels, because the coupling arrangement is moved out of the way. In this way, if any one of the luminaires is faulty and needs replacement, it is not needed to take off the functioning luminaires ones one-by-one until the faulty one is reached.

When slid into its position for performing the coupling, the sprung projections project into the apertures. In this way, when the fixings are tightened, so that the sliding is blocked, the apertures are held at a fixed relative position. The design is preferably such that when tightening the coupling arrangement, the projections of the spring member act to pull the two ends together. Thus, the coupling arrangement provides a self-locking function which provides a high efficiency straight coupling between two luminaires.

In the connection system, the first plate (the outer coupling plate) may be for mounting on an outer surface of the channels and the second plate (the inner spring member) is for mounting on an inner surface of the channels.

The spring member is then accessible from inside the channel and the fixings may then be accessible as well to allow tightening or loosening of the spring member during assembly or disassembly.

The projections of the spring member may each comprise an elbow for projecting into a respective one of the apertures. The elbows function to pull against the apertures to force them together. The elbows are elongate, so the elbow tips form a linear ridge.

The spring member may comprise a flat portion, and the elbows each comprise a rising edge extending from the flat portion to an elbow tip and a falling edge from the elbow tip.

The rising edges are used to urge against a face of the aperture so that the two apertures are pulled together progressively more tightly as the coupling arrangement is tightened. Together, the rising and falling edges allow the spring member to slide out of an aperture in either direction when the coupling arrangement is loosened.

An angle of the rising edges relative to the flat portion may be in the range 40 to 50 degrees. This provides a desired transfer of tightening force of the coupling arrangement to a pulling force between the apertures.

A width of the flat portion, along the direction of the elongate axis, is preferably less than a closest distance between the apertures when the ends are butted together.

This means that when the two ends are butted together, the rising edges of the elbows still push against the apertures, thus providing a continuous compressive force between the two apertures.

A distance between the elbow tips, along the direction of the elongate axis and when the ends are butted together, is preferably greater than said closest distance. This means the two elbow tips can be positioned in the apertures with some slack when the coupling arrangement is loose.

A difference between said distance between the elbow tips and said width of the flat portion is preferably greater two times the difference between said closest distance and said width of the flat portion.

This means that even when one elbow is fully inserted in an aperture (right up to the edge of the flat portion, so that the elbow tip is far away from an edge of the aperture) the tip of the other elbow still aligns with its respective other aperture. This thereby ensures the self-locking function. When the coupling arrangement is slid along the first slots, the two projections (i.e. elbows) will drop into the apertures.

The fixings preferably comprise screws, the spring member comprises non-threaded screw holes and the first plate (the outer coupling plate) comprises threaded screw holes. Thus, no access to the inner spring member is needed to tighten and loosen the fixings. They can be loosened to allow the coupling arrangement to be slid along the first slots to perform disassembly, or they can be tightened (with the projections at least partially in the apertures) to provide the desired straight coupling.

In the luminaire, each aperture for example comprises a second slot perpendicular to the first slot and spaced from the at least one end.

The first and second slots may for example form a cross. Because the second slots are perpendicular to the length direction, they have an edge face which can be used to provide a pulling force of the two channels together.

A length of the first slot is preferably greater than a maximum outer dimension of the fixings parallel to the elongate axis. This means the coupling arrangement of the connection system can be fully retracted into one of the channels so that it is no longer blocking the removal of one luminaire.

The wall portion may comprise guide surfaces for guiding the coupling arrangement of the connection system to a desired position in a direction perpendicular to the elongate axis. This ensures accurate coupling in both the horizontal and vertical directions.

The luminaire for example further comprises one or more of:
a light transmissive cover for covering an opening of the channel, for example a bottom light output plane;
one or more lighting units within each channel; and
a lighting driver mounted outside the channel.

Each channel may comprise a base, opposing side walls and an opening, and wherein the at least one end has two wall portions, one at each side wall, each with a respective first slot and aperture, wherein the at least one end of the channels of two luminaires are for coupling towards each other by two coupling arrangements.

Thus, coupling arrangements may be provided on both side walls of the channels.

The side walls are for example vertical and the opening is a bottom light exit plane of the housing formed by the channel. The two wall portions each for example have a slot and aperture design which forms a cross feature.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
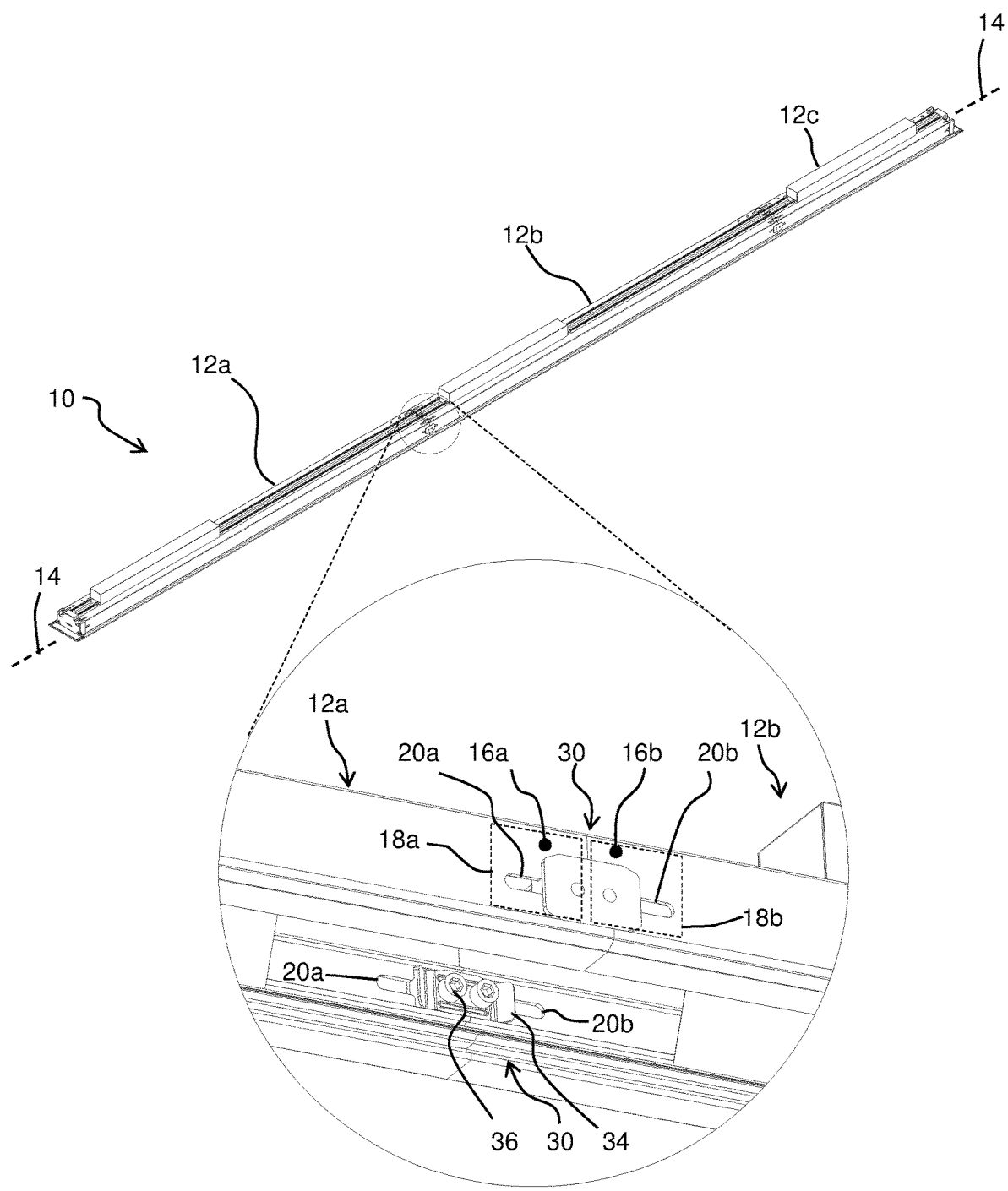
FIG. 1 shows a linear lighting system which includes a connection system for connecting together elongate channels of individual luminaires.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features and advantages of systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a connection system for a linear lighting system in which channels of adjacent luminaires are coupled together by a coupling arrangement having a first plate, a second plate and fixings for clamping the first and second plates around wall portions of the two channels. The fixings are slidable along slots so that the coupling arrangement can be slid into an operable position or to an out-of-the way position for disassembly. One of the first and second plates comprises a spring member having sprung projections for projecting into the apertures, to provide an automatic clamping function when the coupling arrangement is tightened. For example, there may be an outer coupling plate and an inner spring plate which forms the spring member.

FIG. 1 shows a linear lighting system 10 which includes a linear set of luminaires. Each luminaire comprises an elongate channel which forms a housing of the luminaire. A set of three luminaires, and hence three elongate channels 12a, 12b 12c, is shown. There are at least first and second luminaires, and hence at least first and second elongate channels 12a, 12b to be connected together.

Each channel has an elongate axis 14, and when connected as shown in FIG. 1, the elongate axes of course align with each other.

The connection between the channels 12a and 12b is shown enlarged and the discussion below is based on this connection. Corresponding features for the two channels are given the same reference number, with letter "a" for the first channel 12a and letter "b" for the second channel 12b.

The design of the connection between any pair of channels along the line is the same, so that the lighting system is modular. In a preferred implementation, all channels are identical.

Each channel comprises a first end 16a, 16b having a first wall portion 18a, 18b. A wall portion is a notional area of the wall forming the channel which plays a part in the connection between the two channels. The opposite second end of each channel has the same design.

Each channel has a first slot 20a, 20b which extends to the first end (i.e. the channel is open at its end) and within the first wall portion. The first slots 20a, 20b are parallel to the elongate axis 14.

Each channel additionally has an aperture 22a, 22b (first visible in FIG. 3) within its first wall portion.

A coupling arrangement 30 is provided for coupling the first ends together butted against each other.

Figure 2:
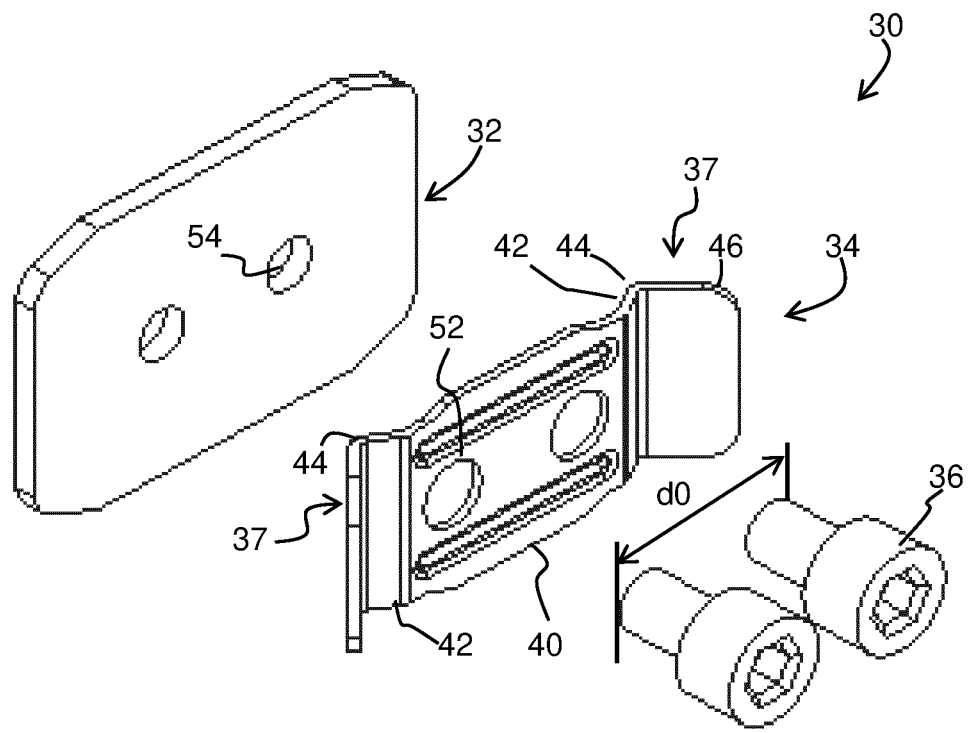
FIG. 2 shows the coupling arrangement of the connection system in more detail.

FIG. 2 shows the coupling arrangement 30 in more detail.

It comprises a first, outer coupling, plate 32, a second, inner spring, plate 34 and screws 36 (more generally any suitable fixing) for clamping the inner spring plate and the outer coupling plate around both first wall portions. Thus, the first wall portions 18a, 18b of the two butted channels are sandwiched between the plates 32, 34.

The screws 36 are slidable along the first slots 20a, 20b, in particular the screws are loose and free in the first slot. This means that if the coupling arrangement is not tight, it can be slid from a central location as shown in FIG. 1 into one of the channels. In this way, it can be moved out of the way of the join between the two channels so that a channel (i.e. a luminaire) may be removed from the overall system for servicing, replacement or repair. This removal is in a lateral direction (i.e. in a direction perpendicular to the length direction of the line of luminaires). This may be sideways or downwards.

In this example, the inner spring plate ("inner" because it is to be mounted inside the channel) defines a spring member. However, more generally, either one of the inner and outer plates may define the spring member. The spring member has first and second sprung projections for projecting into the apertures 22a, 22b. The spring member is for example a spring steel plate. It resists bending back of the projections, so when the coupling arrangement is tight with the projections being pushed back a restoring force is generated which tends to pull the two channels together.

The inner spring plate 34 comprises non-threaded screw holes 52 and the outer coupling plate comprises threaded screw holes 54. Thus, no access the inner spring plate 34 is needed to tighten and loosen the screws. They can be loosened to allow the coupling arrangement to be slid along the first slots to perform disassembly, or they can be tightened (with the projections at least partially in the apertures) to provide the desired straight coupling.

This means the coupling and decoupling is controlled from within the channel. Thus, even if the line of channels is recessed into a ceiling, the channels can be separated before removal from the ceiling.

The projections of the inner spring plate each comprise an elbow 37 for projecting into a respective one of the apertures 22a, 22b. The elbows function to pull against the apertures to force them together.

The inner spring plate 34 comprises a flat portion 40, and the elbows 37 each comprise a rising edge 42 extending from the flat portion to an elbow tip 44 and a falling edge 46 from the elbow tip. The rising edge is used to urge against a face of the aperture so that the two apertures a pulled together progressively more tightly as the coupling arrangement is tightened.

Figure 3:
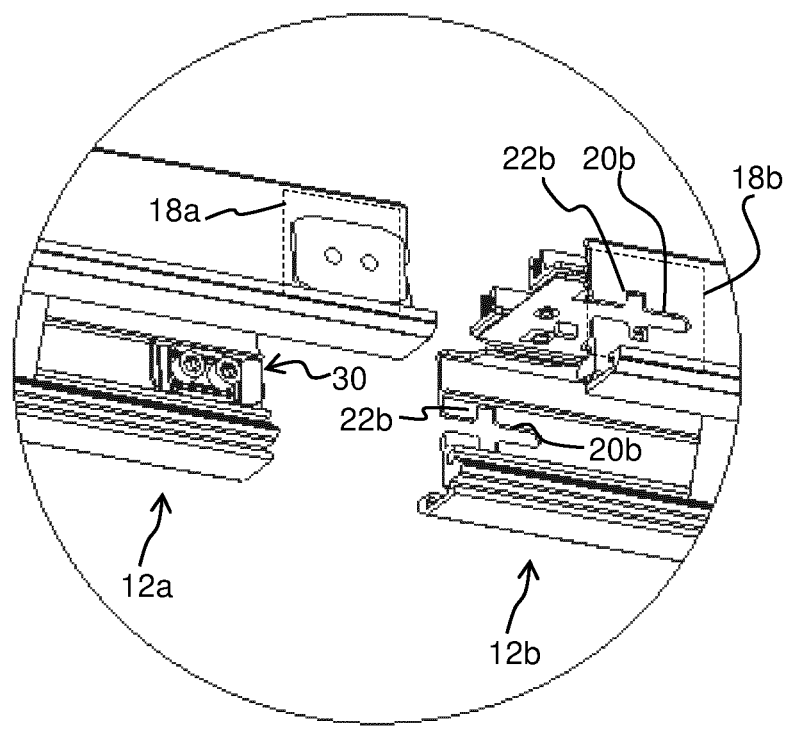
FIG. 3 shows the two channels before they are connected.

FIG. 3 shows the two channels 12a, 12b before they are connected together. The coupling arrangement 30 has been slid into the first channel 12a along the first slot 20a of the first channel.

To enable the coupling arrangement to be slid fully back into the first channel along the first slot 20a, a length of the first slot 20a is greater than a maximum outer dimension of the fixings parallel to the elongate axis. By this is meant the dimension d0 shown in FIG. 2. The first slot is sufficiently long that the coupling arrangement can be retracted so that it does not project beyond the end of the channel, as can be seen in FIG. 3.

In an installed system, such as shown in FIG. 1, when the coupling arrangement is loosened and slid back into one of the adjacent channels along the first slot, the two channels, and hence the two luminaires, may be separated in a lateral i.e. sideways or downward direction. Thus, a luminaire which has been disconnected at both ends can be slid out without disturbing the other luminaires.

For a recessed system, the released luminaire will be slid out vertically downwards, because no sideways movement is possible.

The aperture 22b of the second channel 12b can be seen in FIG. 3. As shown, each aperture 22a, 22b comprises a second slot perpendicular to the first slot 20a, 20b and spaced back from the first end. The second slot may be independent of (i.e. spaced from) the first slot. However, in the example shown the first and second slots may form a cross, which provides a compact design. Because the second slots are perpendicular to the length direction, they have an edge face which can be used to provide a pulling force of the two channels together.

When the coupling arrangement has been slid into its position for performing the coupling (as shown in FIG. 1), the elbows 37 project into the apertures. In this way, when the screws 36 are tightened, so that the sliding of the coupling arrangement is blocked, the apertures 22a, 22b are held at a fixed relative position.

As explained further below, when tightening the screws of the coupling arrangement, the elbows 37 act to pull the two first ends together. Thus, the coupling arrangement provides a self-locking function which provides a high efficiency straight coupling between two luminaires.

FIGS. 1 and 3 show that the outer coupling plate 32 of the coupling arrangement is mounted on an outer surface of the channels and the inner spring plate 34 (the spring member) is mounted on an inner surface of the channels.

Figure 4:
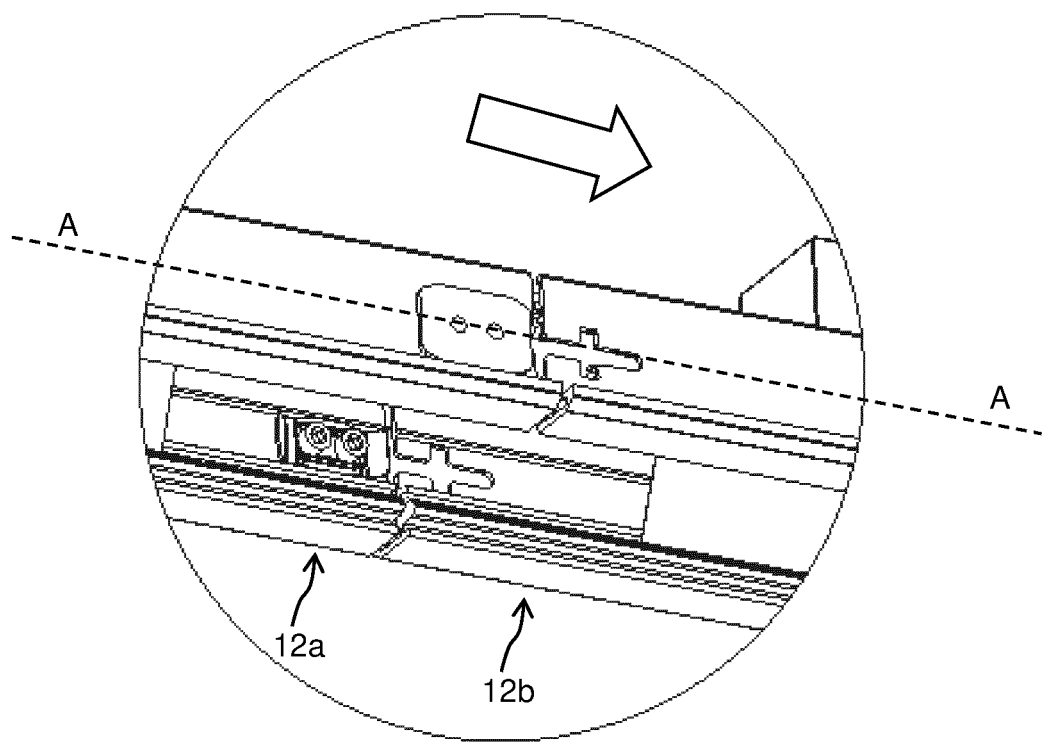
FIG. 4 shows the two channels connected partially together.

FIG. 4 shows the two channels 12a, 12b connected together, with the coupling arrangement still inside the first channel 12a.

Figure 5:
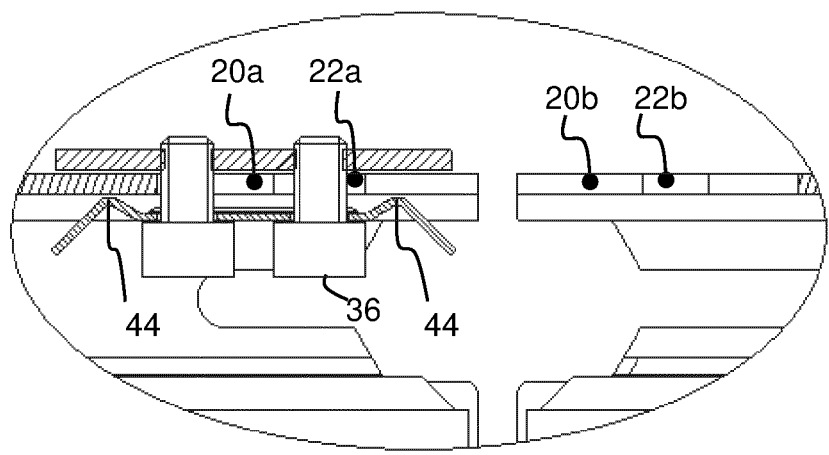
FIG. 5 shows a cross section through the line A-A in FIG. 4.

FIG. 5 shows a cross section through the line A-A in FIG. 4.

The coupling arrangement is at the end of the first slot 20a. The elbows are not aligned with any of the apertures 22a, 22b. The screws 36 are loose so that the inner spring plate 34 is not tightly pressed against the inside of the channel and can slide.

Figure 6:
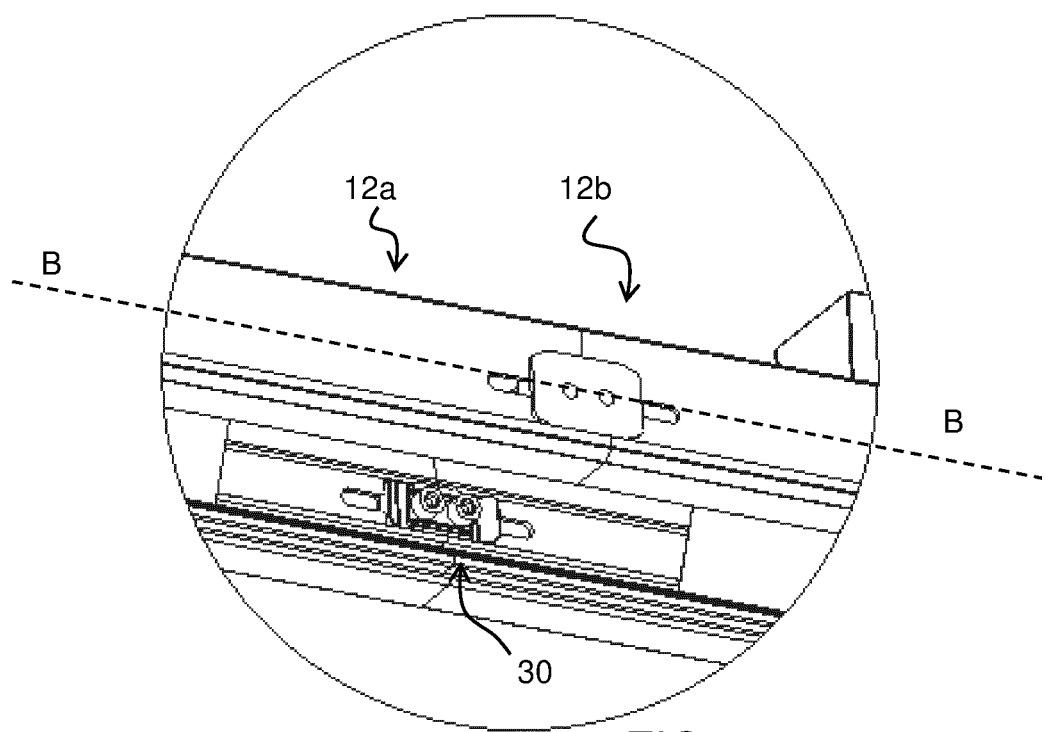
FIG. 6 shows the two channels connected fully together.

FIG. 6 shows the two channels 12a, 12b connected fully together, and the coupling arrangement slid along the slot 20a and partially into the slot 20b. Thus, it bridges across the two ends of the first and second channels 12a, 12b.

Figure 7:
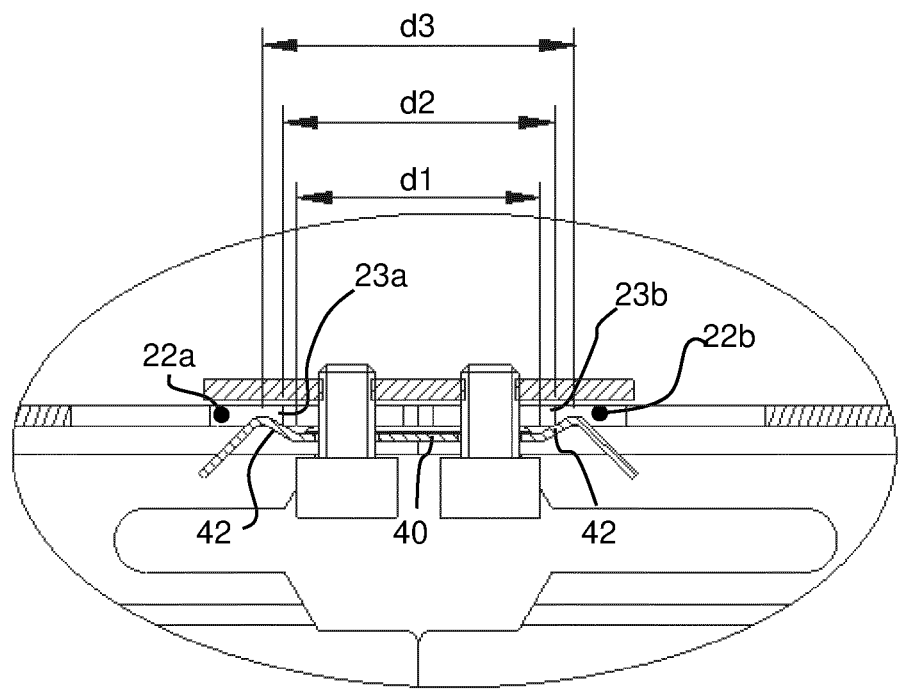
FIG. 7 shows a cross section through the line B-B in FIG. 6.

FIG. 7 shows a cross section through the line B-B in FIG. 6.

The elbows 37 are now aligned with the two apertures 22a, 22b. The screws 36 are then tightened.

When the two first ends are butted together, as shown in FIG. 7, the rising edges 42 contact the inner edges 23a, 23b of the apertures. This means a transverse force applied by the screws is converted to a compressive force between the two channels.

An angle (a1 shown in FIG. 8) of the rising edges 42 relative to the flat portion 40 is for example in the range 40 to 50 degrees such as 45 degrees to provide this conversion of force direction.

FIG. 7 shows various dimensions, which are used to explain a preferred set of designs.

A first dimension d1 is the width of the flat portion 40, along the direction of the elongate axis 14. By way of example, d1 may be in the range 10 to 50 mm, such as 17 mm.

A second dimension d2 is a closest distance between the apertures 22a, 22b (i.e. between the edges 23a, 23b) when the first ends are butted together.

The dimension d1 is preferably less than d2: d1<d2. The difference d2−d1 is for example in the range 1 to 5 mm, for example 2 mm.

This means that when the two first ends are butted together, the rising edges 42 of the elbows still push against the apertures as shown in FIG. 7, thus providing a continuous compressive force between the two apertures.

A third dimension d3 is a distance between the elbow tips 44, along the direction of the elongate axis and when the first ends are butted together.

The dimension d3 is preferably greater than d2: d3>d2. The difference d3−d2 is for example in the range 2 to 10 mm, for example 4 mm. Thus, one example is d1=17 mm, d2=19 mm, d3=23 mm.

This means the two elbow tips can be positioned in the apertures with some slack when the coupling arrangement is loose. Thus, even with a small gap between the first ends, the elbows can be received in their apertures, and the tightening of the screws 36 then pulls the two channels together.

Another preferred condition is explained with reference to FIG. 8.

Figure 8:
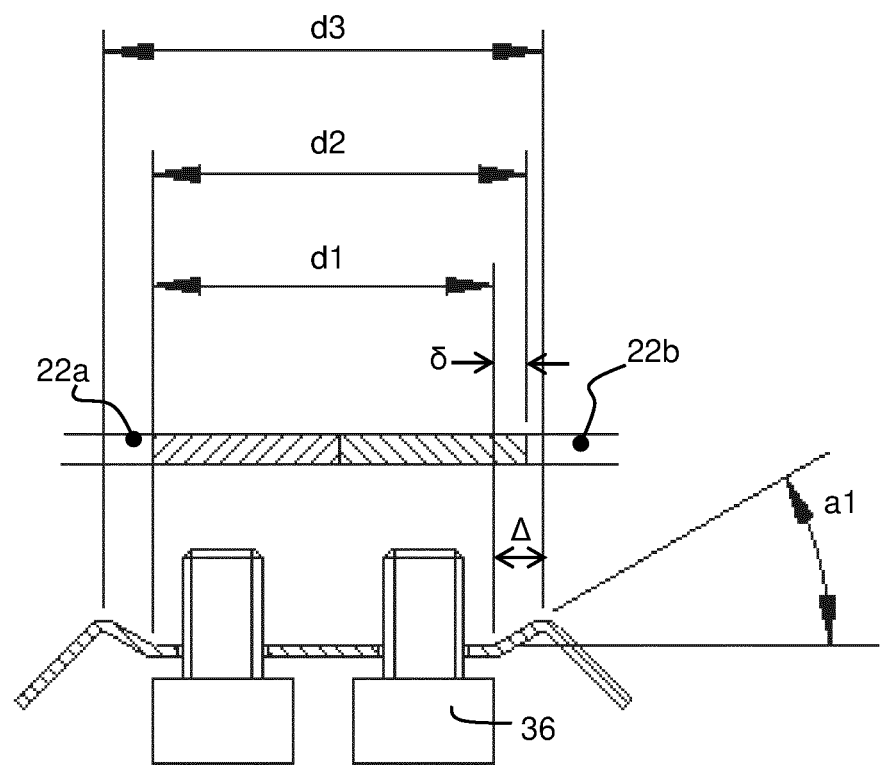
FIG. 8 is used to explain a preferred arrangement of relative dimensions.

FIG. 8 shows one elbow positioned fully in an aperture, so that the edge between the flat portion 40 and the rising edge is at the edge of the aperture 22a. A difference between the dimension d3 is preferably greater than two times the difference between d2 and d1: (d3−d1)>2*(d2−d1). For the example above, d3−d1=6 mm and 2*(d2−d1)=4 mm.

This means that even when one elbow is fully inserted in an aperture (right up to the edge of the flat portion) the tip of the other elbow still aligns with its respective aperture. This thereby ensures the self-locking function.

This can be expressed as Δ>6 with reference to FIG. 8.

Figure 9:
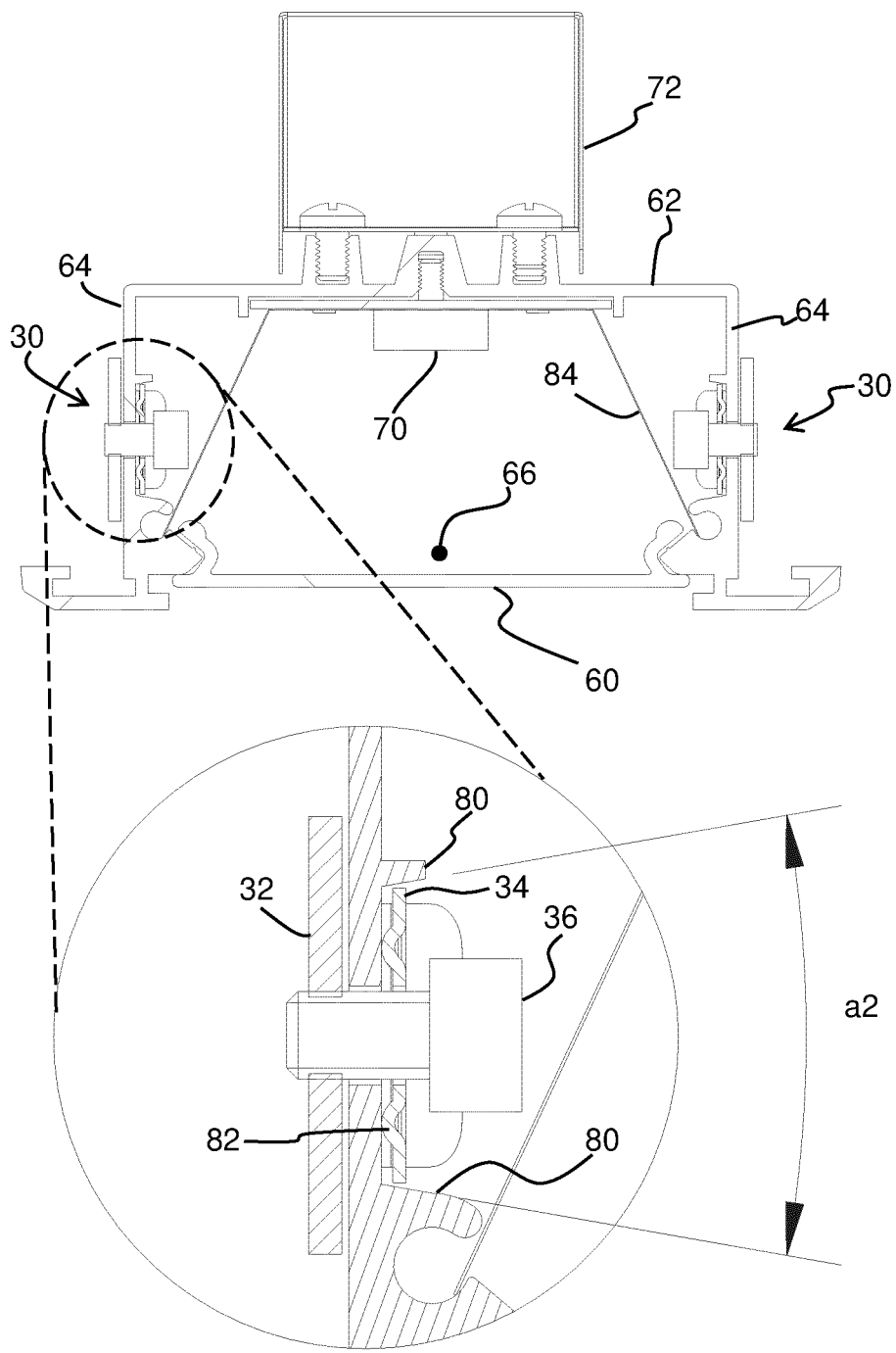
FIG. 9 shows how the channel arrangement is used in an installed lighting system.

FIG. 9 is a cross-sectional view of the linear luminaire, shows how the channel arrangement is used in an installed lighting system. Each channel is shown more clearly to comprise a base 62, opposing side walls 64 and bottom opening light plane 66.

Two coupling arrangements are used, one at each opposing side, as shown in the other figures. For this purpose, each first end has two first wall portions, one at each side wall 64, each with a respective first slot and aperture. FIG. 9 also shows a light transmissive cover 60 for covering the bottom opening light plane 66 of the channel.

One or more lighting units 70 are disposed within each channel and a lighting driver 72 is provided for each channel, mounted outside the channel, above the base 62 of the channel (i.e. on top).

FIG. 9 also shows that the coupling arrangement is guided into position in the up-down direction by a guiding surface 80. The guiding surface slopes relative to the general plane of the channels (i.e. the horizontal plane) with an angle a2 between them (i.e. they slope with an angle a2/2), where the angle a2 is for example 5 to 25 degrees. As the coupling arrangement is tightened, the vertical positions of the two channels are progressively more accurately set so that the coupling is accurate in both the up-down direction as well as within the horizontal plane. Note that the ridges 82 are strengthening ribs of the inner spring plate which extend parallel to the axis 14. They can be seen in FIG. 2.

The channel is for example an aluminum piece made by extrusion. The side wall 64 and guiding surface 80 are thus continuous features.

The coupling between the guiding surface 80 and the inner spring plate 34 resists in-plane bends and also resists bend out of the horizontal plane in that the top and bottom edges of the inner spring plate 34 engage along their length with the guide surfaces. The coupling avoids any gap between two luminaires, and they may each have a flat end plane. This flat end plane makes the sliding in and out of a line of luminaires easy to achieve.

FIG. 9 shows a reflector film 84 which forms a reflective cavity with a base (with the lighting unit 70 mounted on the base) and side walls. The reflector film extends along the length of the luminaire. However, at the ends of the luminaire, end portions of the reflector film are configurable either to allow access to the coupling arrangements so that luminaires can be coupled or decoupled or else to extend over the coupling arrangements.

Thus, after connecting luminaires as shown in FIG. 9, the end portions of the reflector film 84 are reconfigured to cover the coupling arrangement 30.

In one example, the reflector film 84 has end portions which are initially in a folded configuration at the base of the channel (i.e. at the top).

Figure 10:
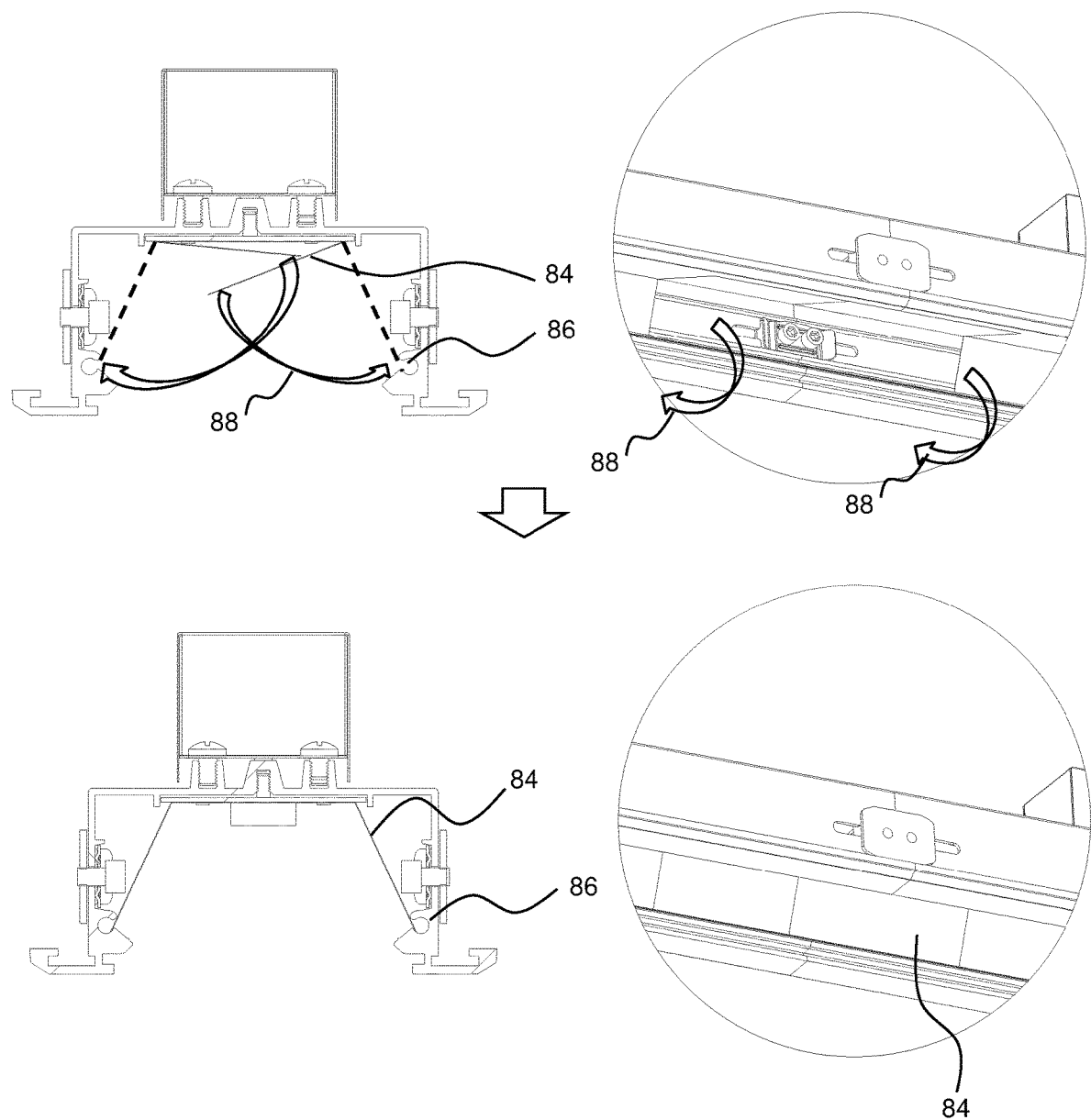
FIG. 10 shows the use of a reflector film to cover inner parts within the channel.

The reconfiguration of the reflector film is shown in FIG. 10. In the top images, flaps (i.e. legs or wings) of the reflector film 84 at the end of the luminaire are shown being unfolded from their initially folded state towards retaining grooves 86, as shown by arrows 88. The top right image shows that these flaps are at the luminaire ends, and when in the folded state, they expose the coupling arrangement.

In the bottom images, the unfolded flaps are clipped into the retaining grooves. The reflector film 84 can then cover all parts and all inner edges in the housing, such as screws, the inner spring plate, and outer edges of the channel. This can avoid a reduction in lighting efficiency.

The detailed example above is only one possible design. The invention more generally relates to the combination of lengthwise slots to allow movement of the coupling arrangement, and additional apertures for receiving sprung projections, thereby providing auto-alignment.

The width of the channels is for example in the range 50 mm to 150 mm and the length may be in the range 50 cm to 150 cm.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A linear lighting system comprising:
a set of at least two luminaires and a connection system, each luminaire comprising:
an elongate channel having an elongate axis, at least one end of the channel comprising:
a wall portion;
a first slot which is within the first wall portion, reaches the at least one end, and is parallel to the elongate axis; and
an aperture within the first wall portion,
wherein the dimensions of the slot and the aperture are arranged to enable connection of the channels of two luminaires together using the connection system for coupling respective ends of the channels of adjacent luminaires;
wherein the connection system comprises a coupling arrangement for coupling respective ends of the channels of two luminaires together butted against each other, the coupling arrangement comprising:
a first plate, a second plate and fixings for clamping the first plate and the second plate and passing through the first slots,
wherein the fixings are slidable along the first slots, and
wherein the second plate comprises a spring member having first and second sprung projections for projecting into the apertures of two adjacent channels.

2. A linear lighting system as claimed in claim 1, wherein the first plate of the connection system is for mounting on an outer surface of the channels and the second plate of the connection system is for mounting on an inner surface of the channels.

3. A linear lighting system as claimed in claim 2, wherein the projections of the spring member of the connection system each comprise an elbow for projecting into a respective one of the apertures.

4. A linear lighting system connection system as claimed in claim 3, wherein the spring member of the connection system comprises a flat portion, and the elbows each comprise a rising edge extending from the flat portion to an elbow tip and a falling edge from the elbow tip.

5. A linear lighting system as claimed in claim 4, wherein an angle (a1) of the rising edges (42) relative to the flat portion (40) is in the range 40 to 50 degrees.

6. A linear lighting system connection system as claimed in claim 4, wherein a width of the flat portion, along the direction of the elongate axis, is less than a closest distance between the apertures when the respective ends are butted together.

7. A linear lighting system as claimed in claim 6, wherein:
a distance between the elbow tips, along the direction of the elongate axis and when the first ends are butted together, is greater than said closest distance; and/or
a difference between said distance between the elbow tips and said width of the flat portion is greater than two times the difference between said closest distance and said width of the flat portion.

8. A linear lighting system as claimed in claim 2, wherein the fixings of the connection system comprise screws, wherein the second plate comprises non-threaded screw holes and the first plate comprises threaded screw holes.

9. A linear lighting system as claimed in claim 1, wherein each aperture of the luminaire comprises a second slot perpendicular to the first slot and spaced from the at least one end.

10. A linear lighting system as claimed in claim 9, wherein a length of the first slot is greater than a maximum outer dimension of the fixings parallel to the elongate axis.

11. A linear lighting system as claimed in claim 9, wherein the wall portion comprises guide surfaces for guiding the coupling arrangement of the connection system to a desired position in a direction perpendicular to the elongate axis.

12. A linear lighting system as claimed in claim 9, further comprising one or more of:
a light transmissive cover for covering an opening of the channel;
one or more lighting units within each channel; and
a lighting driver mounted outside the channel.

13. A linear lighting system as claimed in claim 9, wherein each channel comprises a base, opposing side walls and an opening, and wherein the at least one end has two wall portions, one at each side wall, each with a respective first slot and aperture, wherein the at least one end of the channels of two luminaires are for coupling towards each other by two coupling arrangements.

\* \* \* \* \*